United States Patent
Yamanaka (10) Patent No.: US 11,489,746 B2
(45) Date of Patent: Nov. 1, 2022

(54) DETECTION DEVICE, DETECTION METHOD, AND DETECTION PROGRAM

(71) Applicant: NIPPON TELEGRAPH AND TELEPHONE CORPORATION, Tokyo (JP)

(72) Inventor: Yuki Yamanaka, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/413,954

(22) PCT Filed: Dec. 3, 2019

(86) PCT No.: PCT/JP2019/047166
§ 371 (c)(1),
(2) Date: Jun. 15, 2021

(87) PCT Pub. No.: WO2020/129610
PCT Pub. Date: Jun. 25, 2020

(65) Prior Publication Data
US 2022/0086074 A1    Mar. 17, 2022

(30) Foreign Application Priority Data
Dec. 19, 2018 (JP) .............................. JP2018-237795

(51) Int. Cl.
G06F 15/173 (2006.01)
H04L 43/0817 (2022.01)
G16Y 40/10 (2020.01)

(52) U.S. Cl.
CPC .......... *H04L 43/0817* (2013.01); *G16Y 40/10* (2020.01)

(58) Field of Classification Search
None
See application file for complete search history.

(56) References Cited

U.S. PATENT DOCUMENTS

| 2009/0052330 A1 | 2/2009 | Matsunaga et al. |
| 2017/0147941 A1 | 5/2017 | Bauer et al. |
| (Continued) | | |

FOREIGN PATENT DOCUMENTS

| JP | 2015-108898 A | 6/2015 |
| JP | 2017-139558 A | 8/2017 |
| (Continued) | | |

OTHER PUBLICATIONS

International Search Report and Written Opinion dated Feb. 4, 2020, received for PCT Application PCT/JP2019/047166, Filed on Dec. 3, 2019, 11 pages including English Translation.

(Continued)

*Primary Examiner* — Anh Nguyen
(74) *Attorney, Agent, or Firm* — Xsensus LLP (57) ABSTRACT

A detection apparatus includes processing circuitry configured to acquire, from a storage having stored therein normal communication models for determining, for each function of a communication device, whether or not communication of the communication device having the function is normal, at least one normal communication model that corresponds to a function of a monitoring target communication device, and monitor communication of the monitoring target communication device using the acquired normal communication model, and detect an abnormality in the communication.

4 Claims, 6 Drawing Sheets

(56) References Cited

U.S. PATENT DOCUMENTS

2019/0190938 A1\* 6/2019 Oba ..................... H04L 41/16
2019/0376840 A1 12/2019 Koizumi et al.

FOREIGN PATENT DOCUMENTS

| JP | 2017139558 A | \* | 8/2017 |
| WO | 2018/150616 A1 | | 8/2018 |

OTHER PUBLICATIONS

Kingma et al., "Auto-Encoding Variational Bayes" Available Online At: URL: https://arxiv.org/abs/1312.6114, May 1, 2014, pp. 1-14.

Azuma et al., "An Evaluation of Distributed Cooperative Learning Architecture for Anomaly Detection in Multi-service Shared M2M Area Networks", The Institute of Electronics Information and Communication Engineers, IEICE Technical Report, Jul. 2016, pp. 75-80.

\* cited by examiner

DETECTION DEVICE, DETECTION METHOD, AND DETECTION PROGRAM

CROSS-REFERENCE TO RELATED APPLICATIONS

The present application is based on PCT filing PCT/JP2019/047166, filed Dec. 3, 2019, which claims priority to JP 2018-237795, filed Dec. 19, 2018, the entire contents of each are incorporated herein by reference.

TECHNICAL FIELD

The present invention relates to a detection apparatus, a detection method, and a detection program that are used to detect abnormality in communication of a communication device.

BACKGROUND ART

With the coming of the IoT (Internet of Things) era, IoT device-related traffic session abnormality detection systems and intrusion detection systems (IDS) have been investigated as security measures for various devices.

Some of the above-described abnormality detection systems use a probability density estimator with unsupervised learning, such as a Variational Auto-Encoder (see Non Patent Literature 1).

For example, the abnormality detection system learns event probabilities of normal communication patterns of IoT devices, and thereby creates probability density estimators (models) for determining normal communication of the IoT devices. Then, the abnormality detection system calculates, using the above-described models, the event probability of communication of each monitoring target IoT device, and detects communication with a small event probability as non-normal communication (abnormal communication). With this measure, it is possible to detect an abnormality in communication even without the knowledge of an erroneous communication pattern. The above-described method is suitable for detection of a cyberattack against an IoT device that cannot know all types of threat information, for example.

CITATION LIST

Non Patent Literature

[Non Patent Literature 1] Auto-Encoding Variational Bayes, [searched on Nov. 30, 2018], the Internet <URL: https://arxiv.org/abs/1312.6114>

SUMMARY OF THE INVENTION

Technical Problem

However, when, as described above, a normal communication pattern of a communication device such as an IoT device is learned and a model is created, it is not possible to detect an abnormality in communication of the communication device during a period of time in which the learning is performed for creating the model, and thus the above-described communication device such as an IoT device enters an unsecured state. Moreover, since learning normal communication patterns requires to cover all of the normal communication patterns, the period of time in which learning is performed for model creation often takes long. Accordingly, a period of time in which the communication device is in the unsecured state may also be long.

Therefore, an object of the present invention is to solve the aforementioned problems, and prevent, during a period of time in which a model for detecting an abnormality in communication of a communication device is learned, the communication device from entering a state (unsecured state) in which it is not being subjected to abnormality detection.

Means for Solving the Problem

To solve the above-described object, the present invention includes: processing circuitry configured to: acquire, from a storage having stored therein normal communication models for determining, for each function of a communication device, whether or not communication of the communication device having the function is normal, at least one normal communication model that corresponds to a function of a monitoring target communication device; and monitor communication of the monitoring target communication device using the acquired normal communication model, and detect an abnormality in the communication.

Effects of the Invention

According to the present invention, it is possible to prevent, during a period of time in which a model for detecting an abnormality in communication of a communication device is learned, the communication device from entering a state (unsecured state) in which it is not being subjected to abnormality detection.

DESCRIPTION OF EMBODIMENTS

Hereinafter, an aspect (embodiment) for implementing the present invention will be described with reference to the drawings. The present invention is not limited to the below-described embodiment.

[Overview]

Figure 1:
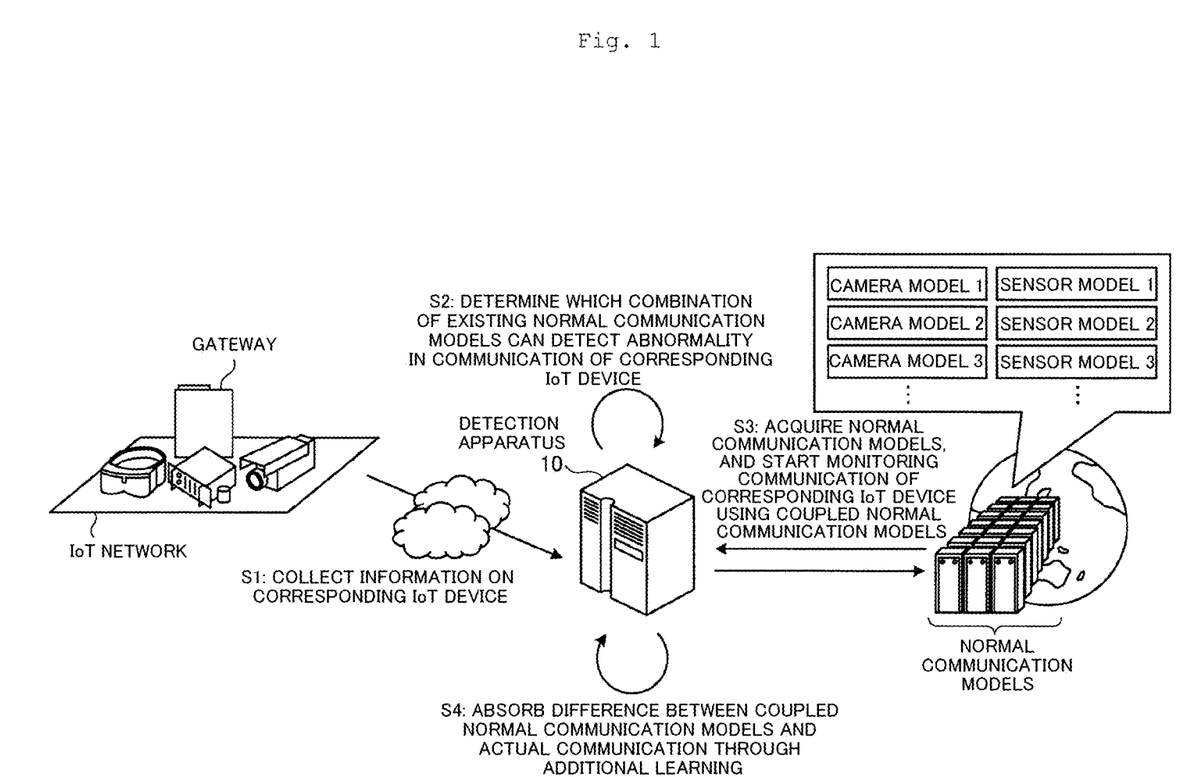
FIG. 1 is a diagram illustrating an overview of a detection apparatus.

First, the overview of the detection apparatus 10 according to the present embodiment will be described with reference to FIG. 1. Here, the description will be given taking a case where communication devices (monitoring target communication devices) that are subjected to abnormality detection by the detection apparatus 10 are IoT devices, as an example. Also, each of the IoT devices is assumed to be connected to the Internet via a gateway.

First, a system is provided with, for each element (function) constituting an IoT device, models (normal communication models) for determining whether or not the IoT device having this element performs normal communication. The normal communication models are created, for example, by sorting communication information (such as traffic information) when the IoT device performs normal communication according to the element (for example, a camera or a sensor) constituting the IoT device, and using a probability density estimator. The normal communication models are accumulated in, for example, a server (not shown).

Then, if a new IoT device is added to a monitoring target IoT network, the detection apparatus 10 acquires information on this IoT device from the gateway or the like (S1). Note that the information that is acquired here is preferably information that can be acquired immediately from the IoT device such as information regarding the machine type of this IoT device, and communication data (traffic information) on this IoT device during a predetermined period of time, for example. The detection apparatus 10 determines, based on the acquired information on the IoT device, which combination of existing normal communication models accumulated in the server can detect an abnormality in communication of this IoT device (S2).

After S2, the detection apparatus 10 acquires, from the server, the normal communication models that can detect an abnormality in the IoT device, couples them together, and starts monitoring communication of the IoT device using the coupled normal communication models (S3). In other words, the detection apparatus 10 uses the coupled normal communication models to monitor communication of the IoT device, and detect an abnormality, if any, in communication of the IoT device.

After S3, the detection apparatus 10 absorbs a difference between the coupled normal communication models and actual communication (actual communication of the IoT device), through additional learning (fine-tuning) (S4).

For example, after the start of monitoring communication of the IoT device in S3, if it is determined that normal communication data of the IoT device has been sufficiently accumulated, the detection apparatus 10 additionally learns the coupled normal communication models based on the communication data. That is, the detection apparatus 10 additionally learns the coupled normal communication models, so as to be able to perform accurate determination regarding normal communication of the IoT device.

Figure 2:
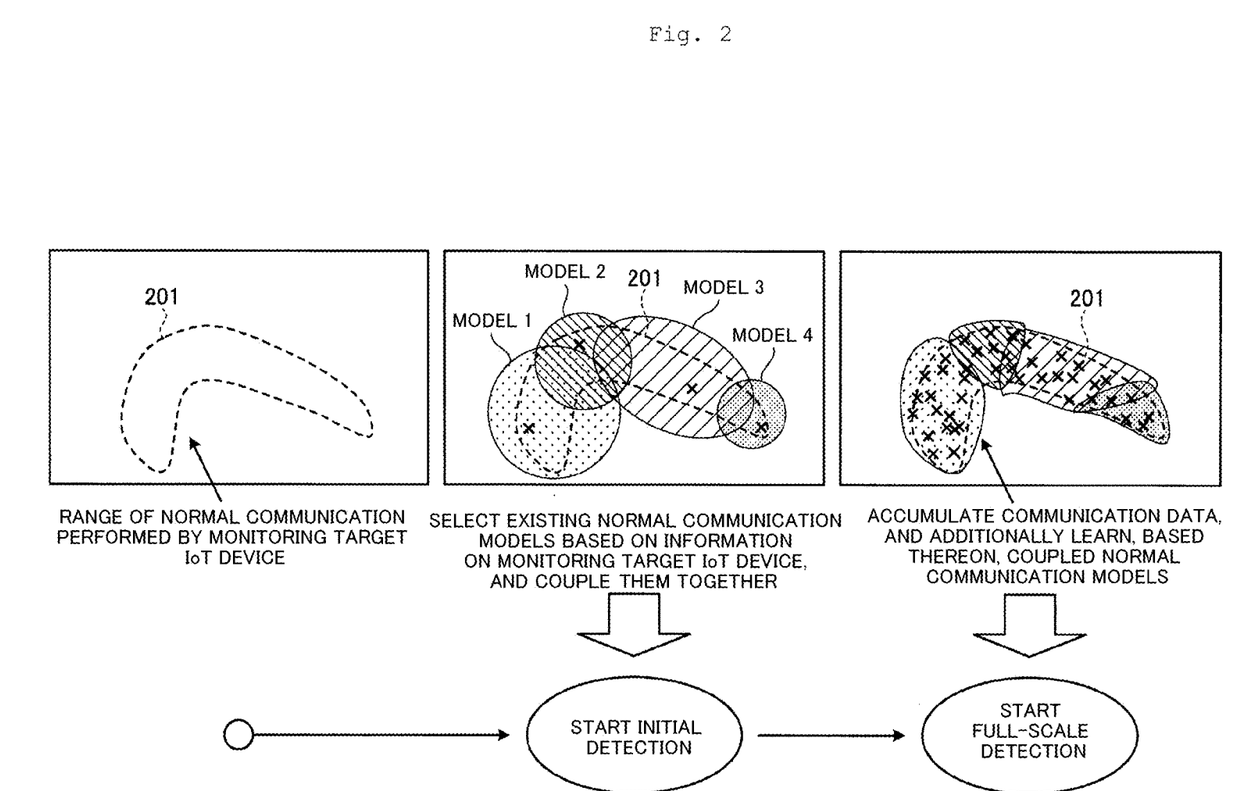
FIG. 2 is a diagram illustrating detection by the detection apparatus using coupled normal communication models, and detection using additionally learned normal communication models.

A case is considered in which, as shown in FIG. 2 for example, the range of normal communication of an IoT device subjected to monitoring by the detection apparatus 10 is a range denoted by the reference numeral 201. In this case, the detection apparatus 10 selects, based on information on the monitoring target IoT device, existing normal communication models (models 1 to 4 in FIG. 2), and couples them together. Then, the detection apparatus 10 starts initial detection for communication of the monitoring target IoT device using the coupled normal communication models.

Here, there is also a case where the range (indicated by the reference numeral 201) of normal communication performed by the monitoring target IoT device does not match the range of communication determined as normal communication by a model obtained by coupling the models 1 to 4 together. Accordingly, when normal communication data of the monitoring target IoT device has been accumulated, the detection apparatus 10 additionally learns, using this communication data, the coupled normal communication models (models 1 to 4 in FIG. 2). Then, the detection apparatus 10 starts full-scale detection for communication of the monitoring target IoT device using the additionally learned normal communication model.

In this way, the detection apparatus 10 first performs initial detection for communication of a monitoring target IoT device using a combination of existing normal communication models. Then, the detection apparatus 10 additionally learns the existing normal communication models based on normal communication data of the IoT device, and then performs full-scale detection for communication of the IoT device using the additionally learned normal communication models. Accordingly, the detection apparatus 10 can prevent the IoT device from entering a state (unsecured state) in which it is not being subjected to abnormality detection during a period of time in which the detection apparatus 10 learns the normal communication models.

[Configuration]

Figure 3:
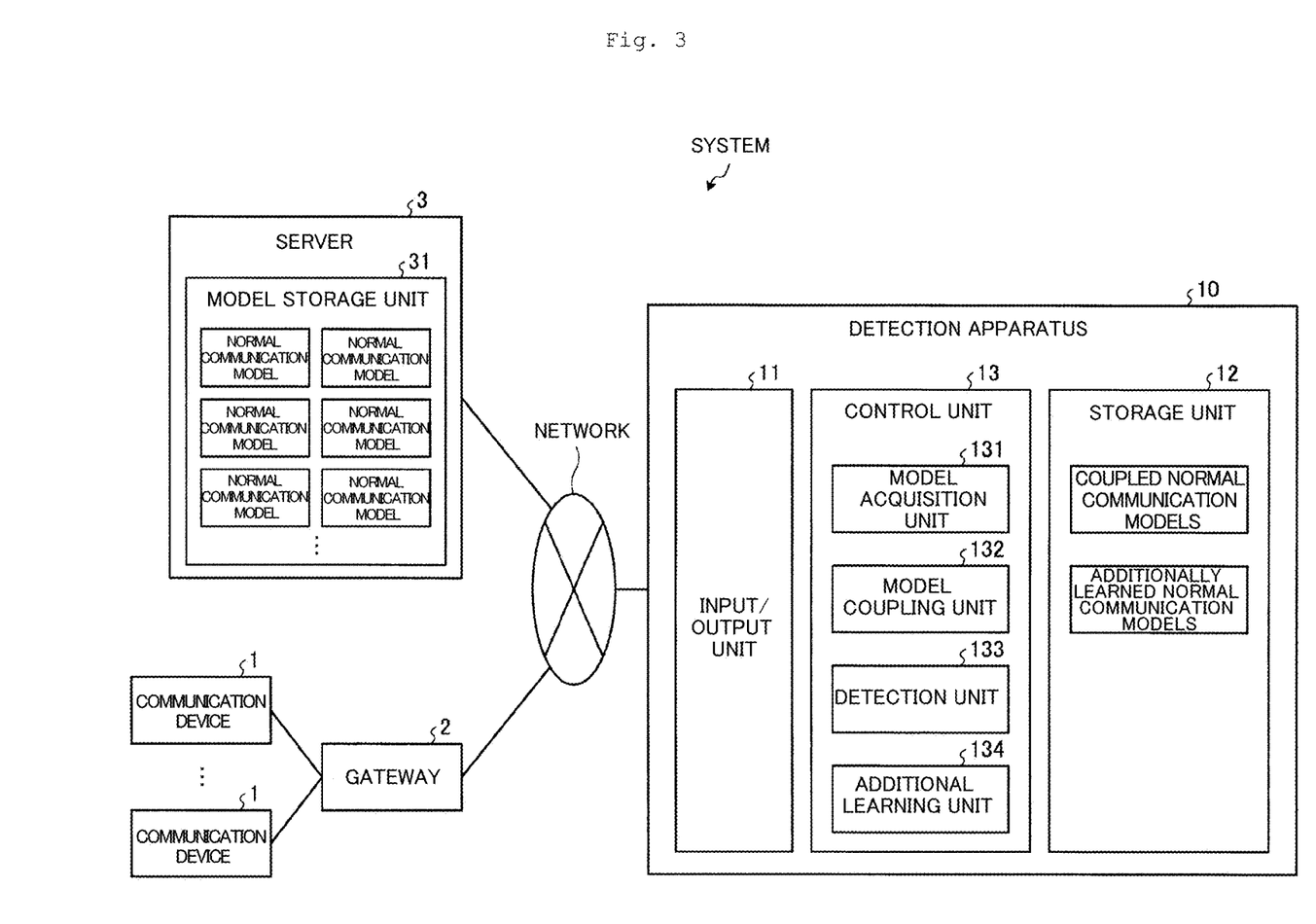
FIG. 3 is a diagram illustrating an example of a configuration of a system that includes the detection apparatus.

The following will describe an example of a configuration of a system including the detection apparatus 10 with reference to FIG. 3. As shown in FIG. 3 for example, the system includes one or more communication devices 1, a gateway 2, a server 3, and a detection apparatus 10.

Each communication device 1 is an apparatus that has a communication function, and is, for example, an IoT device that connects to the Internet via the gateway 2, and performs communication. The gateway 2 is an apparatus that connects each communication device 1 to a network such as the Internet.

The server 3 includes a model storage unit 31 in which one or more normal communication models are stored. The normal communication models are models for determining, for each function of the communication device 1, whether or not communication of the communication device 1 having this function is normal communication. Each normal communication model is realized by, for example, the above-described probability density estimator.

Examples of the normal communication models include a normal communication model relating to a video delivery communication function, a normal communication model relating to a DHCP (Dynamic Host Configuration Protocol) communication function, a normal communication model relating to a management HTTP (Hyper Text Transfer Protocol) communication function, a normal communication model relating to an NTP (Network Time Protocol) communication function, and a normal communication model relating to a temperature notification MQTT (Message Queue Telemetry Transport) communication function.

If, for example, the communication device 1 (monitoring target communication device 1) that is a monitoring target is a network camera, the detection apparatus 10 can determine whether or not communication of the network camera is normal, by combining the normal communication model relating to a video delivery communication function, the normal communication model relating to a DHCP communication function, the normal communication model relating to a management HTTP communication function, the normal communication model relating to an NTP communication function, and the like, the functions being included in the network camera.

Also, if the monitoring target communication device 1 is an IoT sensor having a temperature sensor, the detection apparatus 10 can determine whether or not communication of the IoT sensor is normal, by combining the normal communication model relating to a DHCP communication function, the normal communication model relating to an NTP communication function, and the like, the functions being included in the IoT sensor.

Note that these normal communication models may be provided for each protocol used by the communication device 1, or for each machine-model number of the communication device 1, for example. The normal communication models may also be provided for each type of the communication device 1 (such as a network camera or a sensor), or for each combination thereof (for example, each "yy" protocol of a device of a machine-model number "xx").

The detection apparatus 10 includes an input/output unit 11, a storage unit 12, and a control unit 13. The input/output unit 11 serves as an interface when various types of information are transmitted and received via a network. The storage unit 12 stores various types of information required for the control unit 13 to operate. Also, the storage unit 12 stores normal communication models coupled by the control unit 13, normal communication models additionally learned by the control unit 13, and the like.

The control unit 13 performs overall control of the detection apparatus 10. This control unit 13 includes a model acquisition unit 131, a model coupling unit 132, a detection unit 133, and an additional learning unit 134.

The model acquisition unit 131 acquires, from the server 3, at least one normal communication model that corresponds to the function of the monitoring target communication device 1. For example, the model acquisition unit 131 acquires, from the monitoring target communication device 1, information regarding the type and the machine-model number of the communication device 1, and specifies, based on the information, which functions the communication device 1 has. Then, the model acquisition unit 131 acquires, from the server 3, a normal communication model that corresponds to each of the specified functions.

For example, a case is considered in which the monitoring target communication device 1 is a network camera of a machine type A. In this case, the model acquisition unit 131 specifies the video delivery communication function, the DHCP communication function, the management HTTP communication function, and the NTP communication function, as the functions provided for the network camera of the machine type A. From the server 3, the normal communication models are acquired that relate to the specified functions, namely, the normal communication model relating to the video delivery communication function, the normal communication model relating to the DHCP communication function, the normal communication model relating to the management HTTP communication function, and the normal communication model relating to the NTP communication function are acquired.

If a plurality of normal communication models are acquired by the model acquisition unit 131, the model coupling unit 132 will couple these normal communication models together. For example, if as a normal communication model, a probability density function p(x) is used for calculating the probability density that the communication is normal communication with communication (x) by the monitoring target communication device 1 serving as an input, the model coupling unit 132 will add up the probability density functions p(x) of the normal communication models to be coupled together and thereby couple the normal communication models together. For example, the model coupling unit 132 adds up the probability density functions p(x) serving as each normal communication models, using the following Expression (1).

[Math. 1]

$$P_{concat}(x) = 1/a+b(ap_1(x)+bp_2(x)), \text{where } a+b=1 \quad \text{Expression (1)}$$

The detection unit 133 monitors communication of the monitoring target communication device 1, and detects an abnormality. For example, the detection unit 133 monitors communication of the monitoring target communication device 1 using normal communication models coupled by the model coupling unit 132, and detects an abnormality. Note that after the coupled normal communication models have been additionally learned by the additional learning unit 134, the detection unit 133 monitors communication of the monitoring target communication device 1 using the additionally learned normal communication models, and detects an abnormality.

The additional learning unit 134 additionally learns the normal communication models using normal communication data of the monitoring target communication device 1.

For example, if it is determined that a predetermined amount (an amount for, e.g., one day to one week) of normal communication data of the monitoring target communication device 1 has been accumulated, the additional learning unit 134 additionally learns the coupled normal communication models using the accumulated communication data.

Note that if a result of analysis of the normal communication data of the monitoring target communication device 1 performed by the additional learning unit 134 shows that the coupled normal communication models include an unnecessary normal communication model, the unnecessary normal communication model may be deleted from the coupled normal communication models.

With this measure, the additional learning unit 134 can change the coupled normal communication models acquired by the model acquisition unit 131 to a model with a higher detection accuracy.

The above-described detection apparatus 10 first performs initial detection for communication of a monitoring target IoT device using a combination of existing normal communication models. Then, the detection apparatus 10 additionally learns the existing normal communication models using normal communication data of the IoT device, and then performs full-scale detection for the communication of the IoT device using the additionally learned normal communication models. Accordingly, the detection apparatus 10 can prevent the IoT device from entering a state (unsecured state) in which it is not being subjected to abnormality detection during a period of time in which the detection apparatus 10 learns the normal communication models.

[Processing Procedure]

The following will describe an example of a procedure of processing performed by the detection apparatus 10. First, an example of a procedure in which the detection apparatus 10 monitors communication of a monitoring target communication device using coupled normal communication models obtained by coupling normal communication models acquired from the server 3 will be described with reference to FIG. 4.

Figure 4:
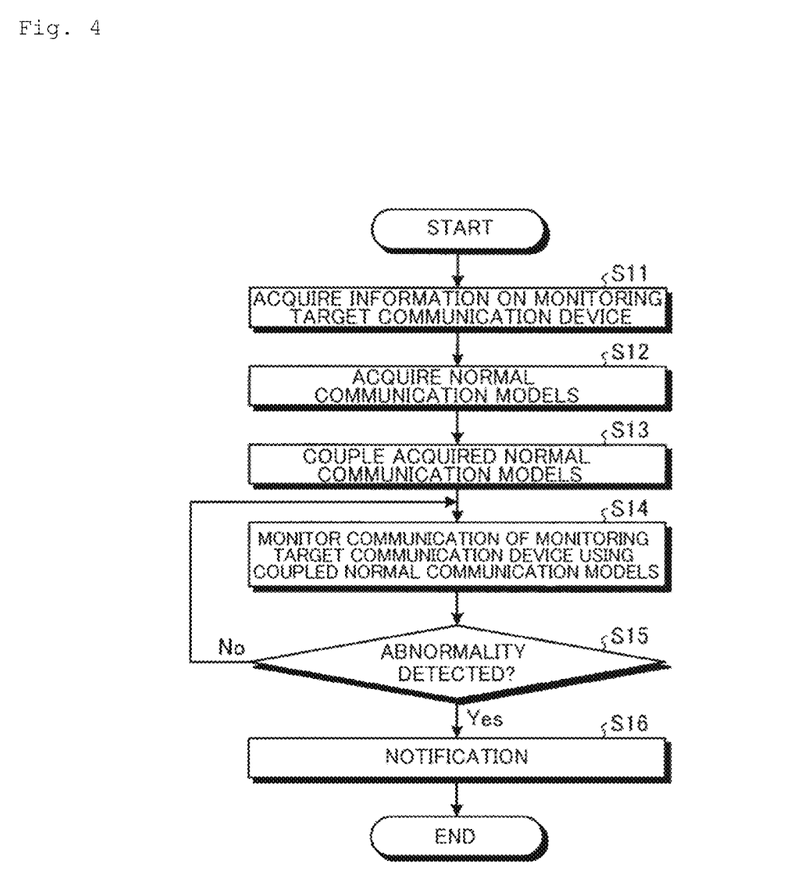
FIG. 4 is a flowchart illustrating an example of a procedure in which the detection apparatus monitors communication of a monitoring target communication device using coupled normal communication models.

For example, when the model acquisition unit 131 of the detection apparatus 10 acquires information on the monitoring target communication device 1 from the gateway 2 (S11), the model acquisition unit 131 acquires, based on the acquired information, normal communication models that correspond to the function of this communication device 1 from among the normal communication models accumulated in the server 3 (S12).

After S12, the model coupling unit 132 couples the normal communication models acquired in S12 (S13). Then, the detection unit 133 monitors communication of the monitoring target communication device 1, using the normal communication models coupled in S13 (S14).

For example, upon acquiring communication data of the monitoring target communication device 1 from the gateway 2, the detection unit 133 determines whether or not communication of the communication device 1 is normal, using the above-described coupled normal communication models. Then, if an abnormality in communication of the monitoring target communication device 1 is detected (Yes in S15), the detection unit 133 perform notification relating to the detection (S16). Also, if no abnormality in communication of the monitoring target communication device 1 is detected by the detection unit 133 (No in S15), the procedure returns to S14.

Figure 5:
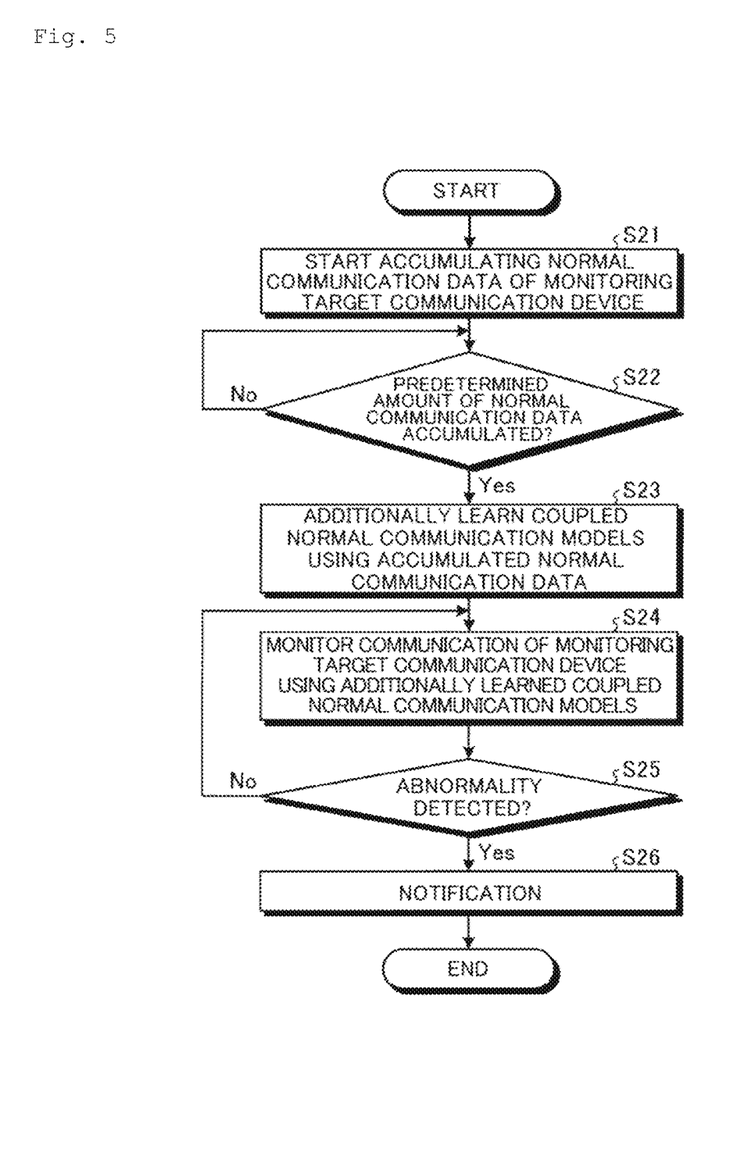
FIG. 5 is a flowchart illustrating an example of a procedure in which the detection apparatus additionally learns the coupled normal communication models, and monitors communication of a monitoring target communication device using the additionally learned normal communication models.

The following will describe an example of a procedure in which, after the processing shown in FIG. 4, the detection apparatus 10 additionally learns the coupled normal communication models, and monitors communication of the monitoring target communication device using the additionally learned normal communication models, with reference to FIG. 5.

After the procedure shown in FIG. 4, the additional learning unit 134 of the detection apparatus 10 starts accumulating normal communication data of the monitoring target communication device 1 (S21), and, if a predetermined amount of normal communication data is accumulated (Yes in S22), the additional learning unit 134 additionally learns the coupled normal communication models using the accumulated normal communication data (S23).

After S24, the detection unit 133 monitors communication of the monitoring target communication device 1 using the additionally learned coupled normal communication models (S24). For example, upon acquiring communication data of the monitoring target communication device 1 from the gateway 2, the detection unit 133 determines whether or not communication of the communication device 1 is normal, using the additionally learned coupled normal communication models. Then, if an abnormality in communication of the monitoring target communication device 1 is detected (Yes in S25), the detection unit 133 performs notification relating to the detection (S26). Also, if no abnormality in communication of the monitoring target communication device 1 is detected by the detection unit 133 (No in S25), the procedure returns to S24.

With this measure, the detection apparatus 10 can prevent the communication device 1 from entering the state (unsecured state) in which it is not being subjected to abnormality detection while the detection apparatus 10 learns normal communication models relating to communication of the monitoring target communication device 1.

Note that the above-described embodiment has described a case where the detection apparatus 10 acquires a plurality of normal communication models from the server 3, but the number of normal communication models that are acquired may be one. In this case, the detection apparatus 10 does not couple the normal communication model, and the detection unit 133 performs initial detection using the normal communication model acquired from the server 3. Also, the additional learning unit 134 performs additional learning of the normal communication model acquired from the server 3. Then, after the above-described additional learning, the detection unit 133 performs full-scale detection using the additionally learned normal communication model.

[Program]

Also, a program for realizing the functions of the detection apparatus 10 that have been described in the foregoing embodiment can be implemented by being installed in a desired information processing apparatus (computer). For example, the information processing apparatus can function as the detection apparatus 10 by executing the above-described program provided as package software or online software. The "information processing apparatus" in this context includes a desktop or notebook personal computer, a rack mount server computer, and the like. In addition thereto, the category of the information processing apparatus also includes, for example, a mobile communication terminal such as a smartphone, a cellular phone, and a PHS (Personal Handyphone System), as well as a PDA (Personal Digital Assistant). Also, the detection apparatus 10 may also be implemented on a cloud server.

Figure 6:
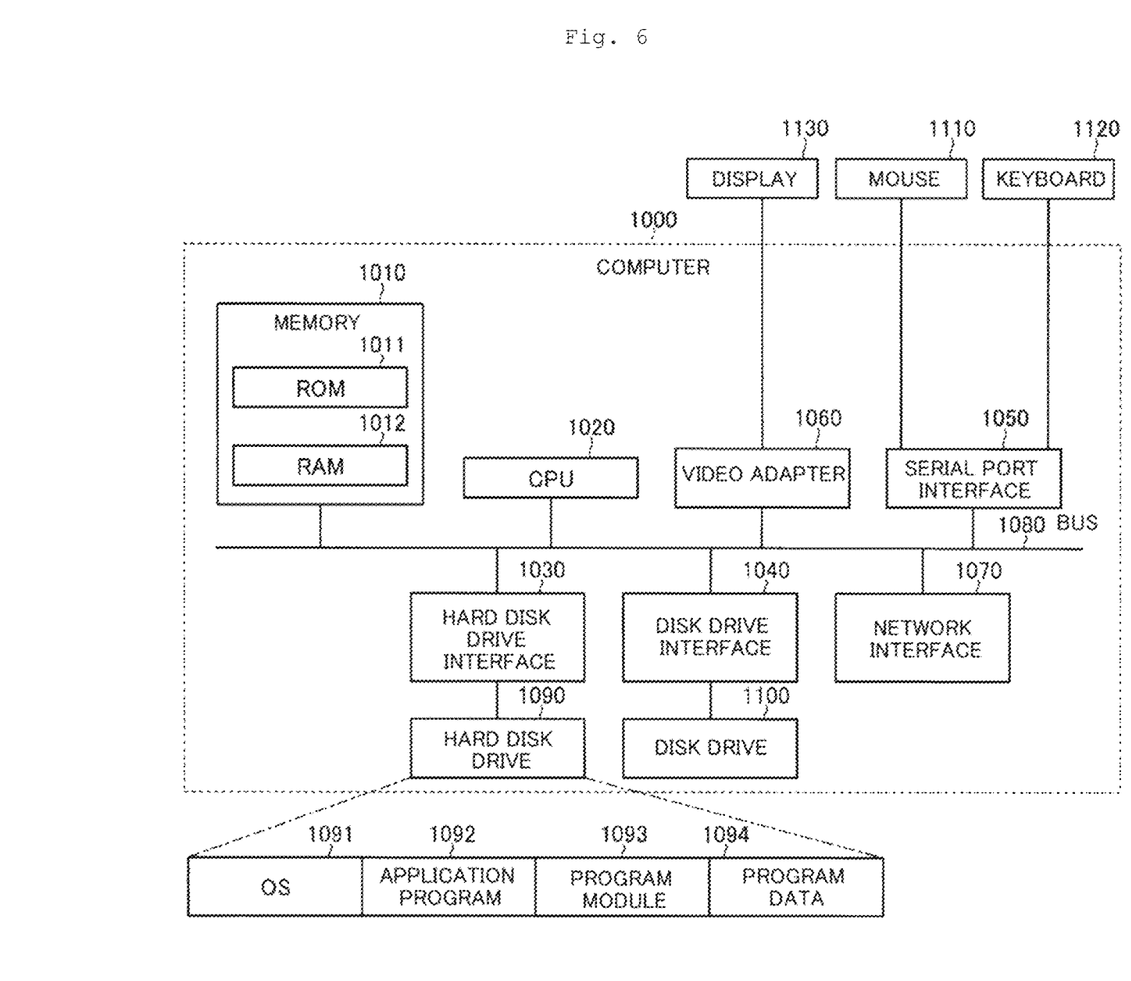
FIG. 6 is a diagram illustrating an example of a computer that executes a detection program.

The following will describe an example of a computer that executes the above-described program (detection program), with reference to FIG. 6. As shown in FIG. 6, the computer 1000 includes, for example, a memory 1010, a CPU 1020, a hard disk drive interface 1030, a disk drive interface 1040, a serial port interface 1050, a video adapter 1060, and a network interface 1070. These components are connected to each other via a bus 1080.

The memory 1010 includes a ROM (Read Only Memory) 1011 and a RAM (Random Access Memory) 1012. The ROM 1011 stores, for example, a boot program such as a BIOS (Basic Input Output System). The hard disk drive interface 1030 is connected to a hard disk drive 1090. The disk drive interface 1040 is connected to a disk drive 1100. For example, a detachable storage medium such as a magnetic disk or an optical disc is inserted into the disk drive 1100. For example, a mouse 1110 and a keyboard 1120 are connected to the serial port interface 1050. For example, a display 1130 is connected to the video adapter 1060.

Here, as shown in FIG. 6, the hard disk drive 1090 stores, for example, an OS 1091, an application program 1092, a program module 1093, and program data 1094. Various types of data and information described in the foregoing embodiment are stored in the hard disk drive 1090 or the memory 1010, for example.

Also, the CPU 1020 reads the program module 1093 or the program data 1094 stored in the hard disk drive 1090 onto the RAM 1012 as needed, and executes the above-described procedures.

Note that the present invention is not limited to the case where the program module 1093 and the program data 1094 according to the above-described detection program are stored in the hard disk drive 1090, but the program module 1093 and the program data 1094 may be stored in, for example, a detachable storage medium, and read by the CPU 1020 via the disk drive 1100 or the like. Alternatively, the program module 1093 and the program data 1094 according to the above-described program may also be stored in another computer connected via a network such as a LAN or a WAN (Wide Area Network), and read by the CPU 1020 via the network interface 1070.

REFERENCE SIGNS LIST

1 Communication device
2 Gateway
3 Server
10 Detection apparatus
11 Input/output unit
12 Storage unit
13 Control unit
131 Model acquisition unit
132 Model coupling unit 133 Detection unit
134 Additional learning unit

The invention claimed is:

1. A detection apparatus comprising:
processing circuitry configured to:
specify a function of a monitoring target communication device based on a type and a machine-model number of the monitoring target communication device;
acquire, from a storage having stored therein normal communication models for determining, for each function, whether or not communication of a communication device having the function is normal, a plurality of normal communication models that correspond to the specified function of the monitoring target communication device;
couple the acquired plurality of normal communication models;
monitor communication of the monitoring target communication device using the coupled normal communication models, and detect an abnormality in the communication; and
start, in response to start of the detection, accumulating normal communication data of the monitoring target communication device, and if a predetermined amount of the normal communication data is accumulated, additionally learn the coupled normal communication models using the accumulated normal communication data.

2. The detection apparatus according to claim 1, wherein the normal communication models each include a probability density function of calculating a probability density that communication of the communication device having the function is normal communication, and
the processing circuitry is further configured to couple the normal communication models by adding up the probability density functions respectively included in the acquired normal communication models.

3. A detection method comprising:
specifying a function of a monitoring target communication device based on a type and a machine-model number of the monitoring target communication device;
acquiring, from a storage having stored therein normal communication models for determining, for each function, whether or not communication of a communication device having the function is normal, a plurality of normal communication models that correspond to the specified function of the monitoring target communication device;
coupling the acquired plurality of normal communication models;
monitoring communication of the monitoring target communication device using the coupled normal communication models, and detecting an abnormality in the communication, by processing circuitry; and
starting, in response to start of the detection, accumulating normal communication data of the monitoring target communication device, and if a predetermined amount of the normal communication data is accumulated, additionally learning the coupled normal communication models using the accumulated normal communication data.

4. A non-transitory computer-readable recording medium storing therein a detection program that causes a computer to execute a process comprising:
specifying a function of a monitoring target communication device based on a type and a machine-model number of the monitoring target communication device;
acquiring, from a storage having stored therein normal communication models for determining, for each function, whether or not communication of a communication device having the function is normal, a plurality of normal communication models that correspond to the specified function of the monitoring target communication device;
coupling the acquired plurality of normal communication models;
monitoring communication of the monitoring target communication device using the coupled normal communication models, and detecting an abnormality in the communication; and
starting, in response to start of the detection, accumulating normal communication data of the monitoring target communication device, and if a predetermined amount of the normal communication data is accumulated, additionally learning the coupled normal communication models using the accumulated normal communication data.

* * * * *